(12) United States Patent
Kunert et al.

(10) Patent No.: US 6,757,317 B2
(45) Date of Patent: Jun. 29, 2004

(54) DEVICE FOR MELTING OR PURIFYING OF INORGANIC SUSTANCES

(75) Inventors: Christian Kunert, Mainz (DE); Uwe Kolberg, Mainz-Kastel (DE); Hildegard Römer, Karben (DE)

(73) Assignee: Schott Glas, Mainz (DE)

( * ) Notice: Subject to any disclaimer, the term of this patent is extended or adjusted under 35 U.S.C. 154(b) by 10 days.

(21) Appl. No.: 10/181,405

(22) PCT Filed: Jan. 11, 2001

(86) PCT No.: PCT/EP01/00272

§ 371 (c)(1),
(2), (4) Date: Aug. 26, 2002

(87) PCT Pub. No.: WO01/53222

PCT Pub. Date: Jul. 26, 2001

(65) Prior Publication Data

US 2003/0048829 A1 Mar. 13, 2003

(30) Foreign Application Priority Data

Jan. 19, 2000 (DE) .......................... 100 02 019

(51) Int. Cl.⁷ ................................................ H05B 6/02
(52) U.S. Cl. ...................... 373/138; 373/151; 373/156; 373/158; 373/7; 373/27; 65/356
(58) Field of Search ................................ 373/138, 139, 373/140, 146, 151, 155, 156, 158, 163, 165, 27, 29, 30, 59; 219/647, 648, 601, 635; 75/10.14, 10.18; 65/45, 356

(56) References Cited

U.S. PATENT DOCUMENTS

| 3,498,778 | A | 3/1970 | Hynd |
| 4,122,718 | A | 10/1978 | Gustafson |
| 4,342,803 | A | 8/1982 | Stengle, Jr. |
| 4,420,876 | A | 12/1983 | McDermott |
| 4,471,488 | A | 9/1984 | Reboux .................... 373/153 |
| 4,579,719 | A | 4/1986 | Keller |
| 4,660,212 | A | 4/1987 | Boen et al. |
| 4,923,508 | A | * 5/1990 | Diehm et al. ............... 373/163 |
| 5,011,562 | A | 4/1991 | Barnoach |
| 5,283,805 | A | * 2/1994 | Kawano et al. ............. 373/156 |
| 5,367,532 | A | 11/1994 | Boen et al. ................. 373/156 |
| 6,109,062 | A | 8/2000 | Richards |
| 6,334,337 | B1 | 1/2002 | Macedo et al. |
| 2001/0052306 | A1 | 12/2001 | Kunert et al. |

FOREIGN PATENT DOCUMENTS

| DE | 3229461 | 2/1984 |
| DE | 4142245 | 6/1993 |
| DE | 199 39 782 | 5/2001 |
| EP | 0 079 266 | 5/1983 |
| EP | 0 528 025 B1 | 6/1996 |
| FR | 1306851 | 11/1961 |
| GB | 794317 | 4/1958 |
| GB | 977546 | 12/1964 |
| GB | 1 221 909 | 2/1971 |
| WO | WO98/38136 | 9/1998 |
| WO | WO 01/14262 | 3/2001 |
| WO | WO 01/14265 | 3/2001 |

* cited by examiner

Primary Examiner—Tu Ba Hoang
(74) Attorney, Agent, or Firm—Baker & Daniels

(57) ABSTRACT

A device for the melting or purifying of inorganic substances, in particular of glass, which comprises a number of metal tubes which may be attached to a cooling medium and which are arranged next to each other, in such a way that together they form a container, a high frequency coil for the injection of energy into the container contents and a plastic coating for the metal tubes, the decomposition temperature of which lies below the temperature of the melt. The cooling system is configured and arranged such that the temperature of the boundary layer of the melt, immediately surrounding the component, lies below that of the decomposition temperature of the coating material.

10 Claims, 1 Drawing Sheet

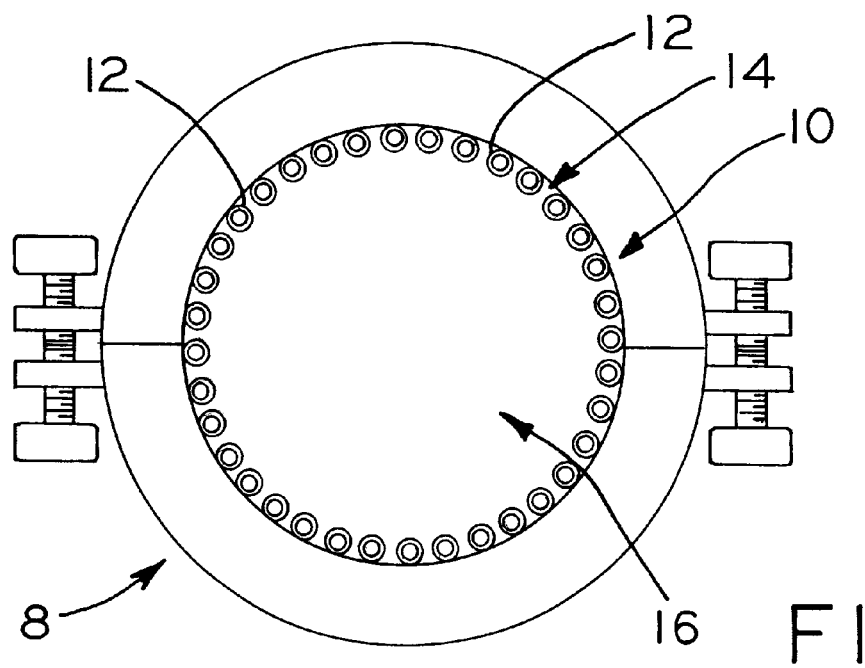
FIG_1
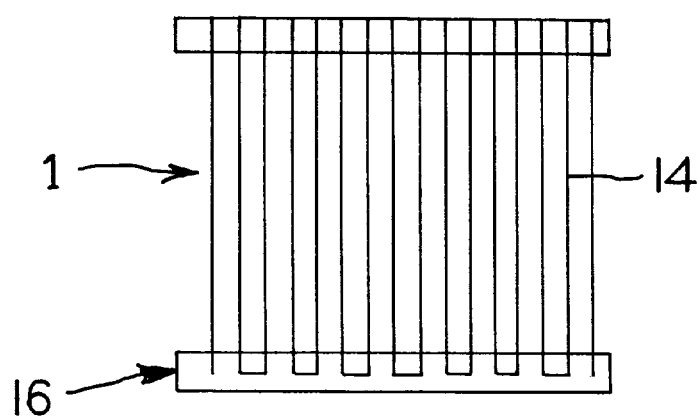
FIG_2

DEVICE FOR MELTING OR PURIFYING OF INORGANIC SUSTANCES

BACKGROUND OF INVENTION

The invention involves a device for melting or refining glass or glass ceramics.

Devices of this type have become known in the form of so-called skull crucibles. They contain a crucible wall 10. This wall 10 is generally cylindrical. It is made out of a ring of vertical metal pipes 12. Slits 14 remain between pipes 12 that are adjacent to each other. The bottom 16 of the crucible can also be made out of metal pipes. It can, however, also be made out of a fireproof material. At their ends, they are connected to vertical pipes for supplying coolant and/or for discharging coolant.

The heating is done by an induction coil (not shown) that surrounds the crucible wall 10, and via which high-frequency energy can be introduced into the contents of the crucible 8.

A skull crucible of this type has been made known, for example, from the patent EP 0 528 025 B1.

A skull crucible 8 operates as follows: the crucible 8 is filled with a glass batch or refuse glass (shards) or a mixture of them. The glass, and/or the melt, must be preheated at first in order to reach a certain minimum conductibility. The pre-heating is frequently done by burner heating. Once the coupling temperature has been reached, then the additional supply of energy via the irradiation of high-frequency energy can occur. Also, during the operation, it can be advantageous in special cases to heat the melt by burners which act on the melt from above, or by hot exhaust gases, in addition to the heating by high-frequency energy. This is especially necessary in some cases when using a skull crucible for refining. If the surface layer is namely cold and has a correspondingly higher viscosity, then bubbles are prevented from emerging out of the melt, or foam can form.

The skull principle can also be applied for containers other than crucibles. See the patent DE 199 39 782 A1, for example. In this process, several pipes are designed in a U-shape and lie adjacent to each other, so that they form a cage-like skull channel with each other that is open to the top. An induction coil then surrounds this channel in such a way that winding sections extend along the side walls of the channel.

The invention thus involves any type of device in which a container is made from many metal pipes, which themselves can be connected to a cooling medium, and in which high-frequency energy is introduced into the contents of the container.

The metal pipes mentioned are generally made of copper. This results in the following problems:
On the one hand, there is the danger that copper from the copper pipes gets into the melt. This leads to pronounced color streaking as a result of the copper impurity.

An additional problem consists in that gaseous or solid components escaping from the glass, such as, for example: HF, $P_2O_5$, $B_2O_3$, $SO_2$, $SO_3$, $Cl_2$ precipitate onto the cooled part of the crucible not covered by the melt and cause corrosion there. This leads to a damage of the crucible and to impurity of the melt.

Furthermore, a removal of the residual glass when cleaning the container is expensive and painstaking, since this residual glass persistently adheres to the surfaces of the metal pipes.

SUMMARY OF THE INVENTION

The purpose of the invention is to create a device of the type named at the beginning in such a way that impurities of the glass melt due to the material of the metal pipe do not occur, that no corrosion occurs, and that the problem of the adherence of the glass melt does not occur.

The invention, in one form thereof, is a device for melting or refining inorganic substances, especially glass, wherein a plurality of metal pipes are connected to a cooling medium and lie next to each other in such a way that they form a container, and a high frequency coil is used for introducing energy into the contents of the container. The metal pipes are coated with a plastic having a decomposition temperature that is below the temperature of the melt and the cooling system is designed and arranged in such a way that the temperature of the boundary layer of the melt contacting the coated pipes is below the decomposition temperature of the coating material.

DETAILED DESCRIPTION

To achieve the intended purpose, different methods had been proposed previously. The use of platinum instead of copper is not only considerably more expensive, but also is not a perfect solution in terms of preventing impurities in the glass melt. The concept of using plastics had to be considered to be wrong from the beginning on, because of the low melting point of these materials. The inventors recognized, however, that plastics, in spite of their low softening temperature and in spite of their low decomposition temperature, come into consideration very well as a coating material, and they are suitable for solving the problems. As has been revealed in experiments, the cooling of the metal pipes caused the contact temperature between, on the one hand, the plastic of the plastic coating according to the invention, and on the other hand, the glass melt, to stay below the decomposition temperature of the plastic. The plastic coating remained undamaged after the experiments. The melting container could be reused.

By the plastic coating according to the invention, the most important of the partial purposes named above is achieved. Namely, a contamination of the melt does not occur. In the practical case, alkali zinc silicate glasses were melted in the skull crucible 8. Fibers, which were manufactured out of this glass, had an extremely low damping, which means that the coating prevented copper from diffusing out of the skull crucible into the melt. In a control experiment, uncoated copper pipes were used. These pipes led to considerable color streaking by copper impurity.

In another experiment, phosphate and fluorophosphate glasses were melted in a crucible designed according to the invention. The glasses exhibited a high optical purity, which otherwise is only obtained in platinum melting crucibles. Furthermore, the melt was free of platinum particles, which can, of course, not be guaranteed for platinum crucibles. The glasses were suitable for high-energy laser applications. Devices with plastic coating according to the invention are also suitable for oxide salt or metal melts. In the process, the expert will match the parameters of cooling, on the one hand, and the plastic properties, on the other hand, to each other.

The other important partial purpose of avoiding corrosion is achieved in a perfect manner. Corrosion does not occur in cooling pipes coated according to the invention.

Also, in the application of the coating according to the invention, no adhesion of glass residues occurs. Thus, the expense for the removal of these residues can be eliminated so that the cleaning of the crucible at the end of a melting or refining process is not a problem.

An additional, advantageous effect of the invention is in the following: the layer according to the invention is an excellent electric insulator. It prevents electric arc-over between individual areas of the crucible. This effect has a quite important economic significance. It allows an enlargement of the crucible. When the crucible 8 is larger and can thus accommodate a higher volume, the refining or melting operation is more economical. Normally, a maximum crucible height is found when the induction voltages occurring in the cooling fingers, if they become too large, discharge via the melt. This leads to the formation of an electric arc and to the destruction of the skull crucible. However, if the cooling fingers are coated with Teflon, then induction voltages can occur before the formation of an electric arc begins.

In a practical experiment, the following parameters were present:

The crucible involved a standing skull crucible made of copper pipes with a wall thickness of 1 mm.
The coating consisted of a plastic containing high amounts of fluorine.
The coating thickness was 150 $\mu$.
The softening temperature of the plastic was 300° Celsius.
The decomposition temperature of the plastic was 450° Celsius.
The copper pipes were water-cooled.
In the crucible, phosphate glasses, fluorophosphate glasses and alkali zinc silicate glasses were melted.
The melting temperature was up to 1500° Celsius.

The coating thickness of the material must not be too large. The reason for this is the following: plastic is indeed known to be a heat damping material and thus prevents the flow of heat from one side to the other. If the coating is too thick, then this can make it so that sufficient heat is no longer drawn off, from the melt located in the contact area with the plastic, by the cooling medium flowing in the metal pipe. The area mentioned would then accommodate temperatures that are above the decomposition temperature of the plastic. This is also the reason why, in general, plastic can not be used as a base material of the pipe instead of the metal. A composite made of an inner metal pipe and an outer plastic pipe with corresponding coordination of the thickness of the plastic layer with the operating conditions of the process is required. This applies especially, as mentioned above, to the temperature of the melt prevalent in the process. In any case, a good conducting material is thus required as a base material. Experience has shown thus far that the coating thickness of the plastic must be a few millimeters at maximum, and generally less than 1 mm.

As a base material of the pipe, copper can be used especially as mentioned above, but also appropriate are platinum, steel, pure metals, aluminum, or alloys made of these metals.

Devices according to the invention are especially suitable for the following applications:

For the manufacture of alkali zinc silicate glasses;
For the manufacture of phosphate glasses;
For the manufacture of fluorophosphate glasses;
For the manufacture of lanthanum borate glasses;
For the manufacture of glasses that release corrosive gases such as $SO_2$, $SO_3$, $Cl_2$, or HF during manufacturing;
For the manufacture of dimming glasses that contain sulfur, selenium and/or tellurium compounds;
For the manufacture of glasses that are mixed together in a manufacturing process with elementary halogens, especially chlorine, in order to remove dissolved water, for example;
For the manufacture of oxide melts that crystallize when cooling;
For the manufacture of corrosive glasses.

What is claimed is:

1. A device for melting or refining inorganic substances such as glass, comprising:

a plurality of pipes connected to a cooling medium, said pipes disposed next to each other in such a way that they together form a container; and a high frequency coil for introducing energy into contents of the container to form a melt;

said pipes being coated with a plastic coating having a decomposition temperature that is below the temperature of the melt;

the cooling medium in the pipes being such that the temperature of a boundary layer of the melt contacting the coated pipes is below the decomposition temperature of the plastic coating.

2. The device according to claim 1, wherein the coating has a thickness of 250$\mu$ or less.

3. The device according to claim 2, wherein the coating is a plastic that contains fluorine.

4. The device according to claim 3, wherein the base material of the pipes is copper.

5. The device according to claim 1, wherein the coating is a plastic that contains fluorine.

6. The device according to claim 5, wherein the coating contains fluoroalkoxy.

7. The device according to claim 6, wherein the base material of the pipes is copper.

8. The device according to claim 2, wherein the base material of the pipes is copper.

9. The device according to claim 1, wherein the base material of the pipes is copper.

10. The device according to claim 2, wherein the base material of the pipes is copper.

* * * * *

UNITED STATES PATENT AND TRADEMARK OFFICE
CERTIFICATE OF CORRECTION

PATENT NO. : 6,757,317 B2
DATED : June 29, 2004
INVENTOR(S) : Kunert et al.

It is certified that error appears in the above-identified patent and that said Letters Patent is hereby corrected as shown below:

Title page, Item [54] and Column 1, line 1,
Title, after "INORGANIC" delete "SUSTANCES" and substitute therefor
-- SUBSTANCES --

Signed and Sealed this

Thirty-first Day of August, 2004

JON W. DUDAS
*Director of the United States Patent and Trademark Office*